April 6, 1948. N. HEIMBACH 2,439,210
PHOTOGRAPHIC SILVER-HALIDE EMULSIONS CONTAINING
1, 3, 4-TRIAZAINDOLIZINE CYANINE DYES
Original Filed April 11, 1946    3 Sheets-Sheet 1
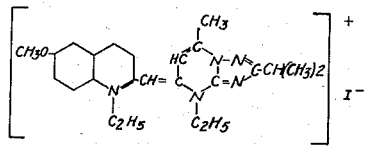
Fig. 1
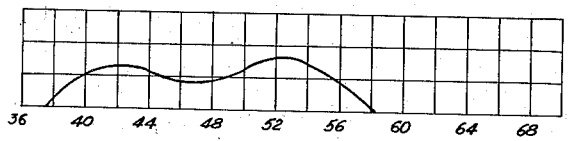
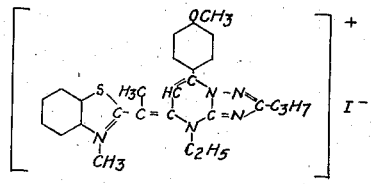
Fig. 2
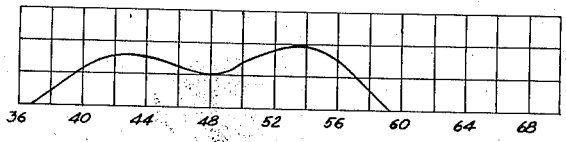
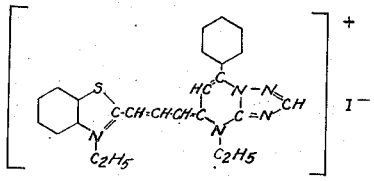
Fig. 3
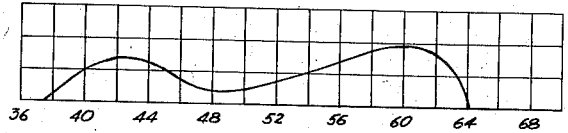
INVENTOR.
NEWTON HEIMBACH
BY
ATTORNEYS

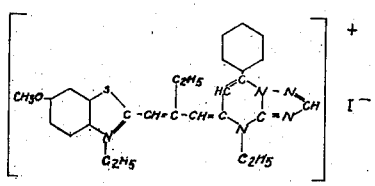
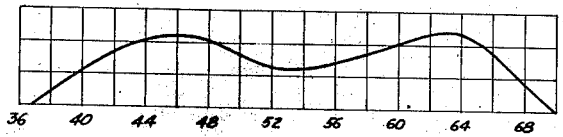
Fig. 4
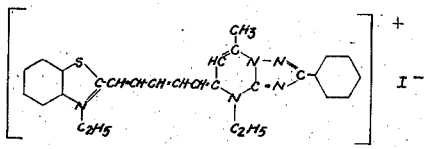
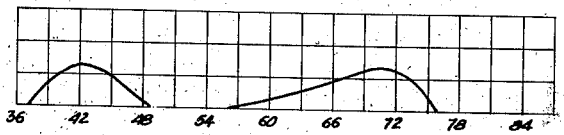
Fig. 5
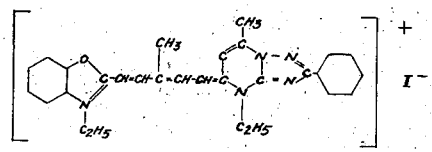
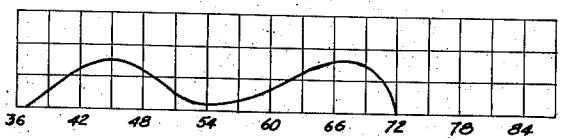
Fig. 6
INVENTOR.
NEWTON HEIMBACH
ATTORNEYS April 6, 1948.    N. HEIMBACH    2,439,210
PHOTOGRAPHIC SILVER-HALIDE EMULSIONS CONTAINING
1, 3, 4-TRIAZAINDOLIZINE CYANINE DYES
Original Filed April 11, 1946    3 Sheets-Sheet 3
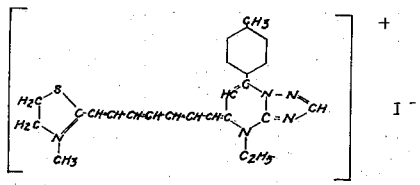
FIG. 7.
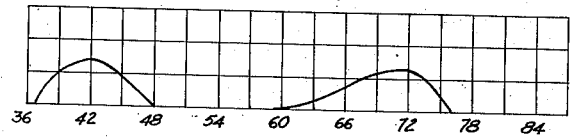
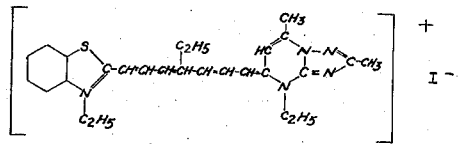
FIG. 8
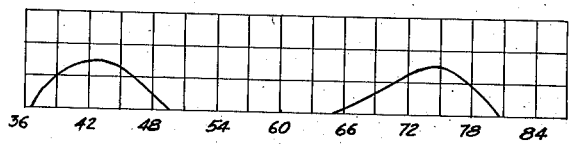
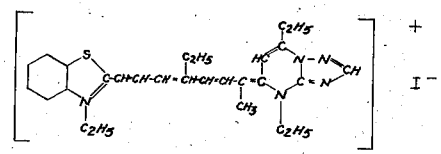
FIG. 9
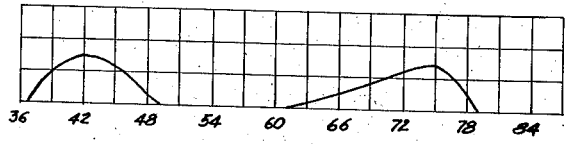
INVENTOR.
NEWTON HEIMBACH
BY
ATTORNEYS Patented Apr. 6, 1948

2,439,210

UNITED STATES PATENT OFFICE 2,439,210

PHOTOGRAPHIC SILVER-HALIDE EMULSIONS CONTAINING 1,3,4-TRIAZAINDOLIZINE CYANINE DYES

Newton Heimbach, Binghamton, N. Y., assignor to General Aniline & Film Corporation, New York, N. Y., a corporation of Delaware Original application April 11, 1946, Serial No. 661,353. Divided and this application June 7, 1946, Serial No. 675,289

4 Claims. (Cl. 95—7)

This invention relates to photographic gelatino-silver-halide emulsions, and more particularly to photographic emulsions sensitized by means of new asymmetrical dyes of the 1,3,4-triazaindolizine type.

In the preparation of cyanine sensitizing dyes, a large variety of heterocyclic bases have been used in the form of their quaternary salts to obtain dyestuffs with varying degrees of sensitizing activity and sensitizing ranges. A wide choice of symmetrical and asymmetrical dyes is possible by a suitable choice of intermediates. Moreover, similar bases are used in combination with a variety of heterocyclic compounds containing active methylene groups to produce merocyanine dyes.

The quaternary dyestuffs obtained from non-quaternary nitrogen-containing heterocyclic bases such as thiazoles, oxazoles, selenazoles, quinaldines and the like; for the most part, have extremely low water solubility and, accordingly, are not always readily removed from the photographic layers in aqueous processing baths. The residual dye stain is particularly undesirable in photographic films and papers. Moreover, it may frequently be desirable to use such dyes as screening or filter layers, in which case large concentrations of the dyes are necessary. Such applications are often limited by the difficulty of removal of dyestuff from the layer during the processing operations because of low water solubility.

Previous proposals to obtain dyestuffs of suitable water solubility were largely dependent upon a choice of the particular quaternary salt used. For example, acid groups such as α-halogen acetic acids have been introduced during quaternation to increase solubility.

An object of the present invention is to provide photographic silver-halide emulsions with sensitizing dyestuffs containing a 1,3,4-triazaindolizine nucleus.

A further object is to provide such dyes which are added to photographic silver-halide emulsions or coated thereon as an overcoating, whereby the sensitivity of the emulsion is increased.

A still further object is to provide photo-sensitizing dyestuffs having appreciable water solubility and readily removed from the exposed emulsion layer during processing.

Other objects will appear hereinafter.

I have discovered that the bases of 1,3,4-triazaindolizine give rise to several different series of cyanine dyes, all of which are excellent sensitizers for photographic emulsions. The bases, which are numbered in accordance with Beilstein and accepted usage, have the following general formula:

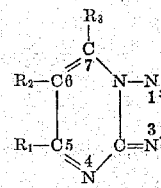

wherein $R_1$ represents an alkyl group, e. g., methyl or ethyl, $R_2$ represents hydrogen, alkyl, e. g., methyl, ethyl, propyl, butyl, and the like, carbalkoxy, e. g., carbmethoxy, carbethoxy, carbpropoxy and the like, aryl, e. g., phenyl, tolyl, phenethyl, naphthyl, diphenyl and the like, and $R_3$ and $R_4$ represent hydrogen, alkyl and aryl as in $R_2$, aralkyl, e. g., benzyl, methyl benzyl, ethyl benzyl, etc., alkoxyphenyl, e. g., methoxyphenyl, ethoxyphenyl, propoxyphenyl and the like, dialkoxyphenyl, e. g., dimethoxyphenyl, diethoxyphenyl, dipropoxyphenyl, and the like.

The compounds numbered from 1 to 6, 9 to 14, and 16 to 22 are prepared by heating a 3-amino-1,2,4-triazole with an appropriate β-diketone in absolute alcohol in the presence of a small quantity of an organic base such as triethylamine or piperidine. The actual method employed in this synthesis is described in Berichte, 42, 4638–4644, and Berichte, 43, 375–381. Compounds numbered 7, 8 and 15 are prepared by heating the same triazole with ethyl ethoxymethylene-acetoacetate in glacial acetic acid.

The bases represented by the above general formula and prepared in accordance with the above references and procedure are as follows:

(1)

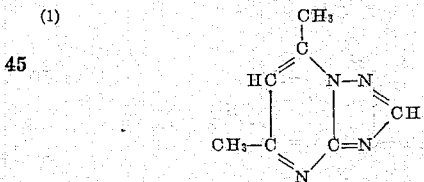

5,7-dimethyl-1,3,4-triazaindolizine

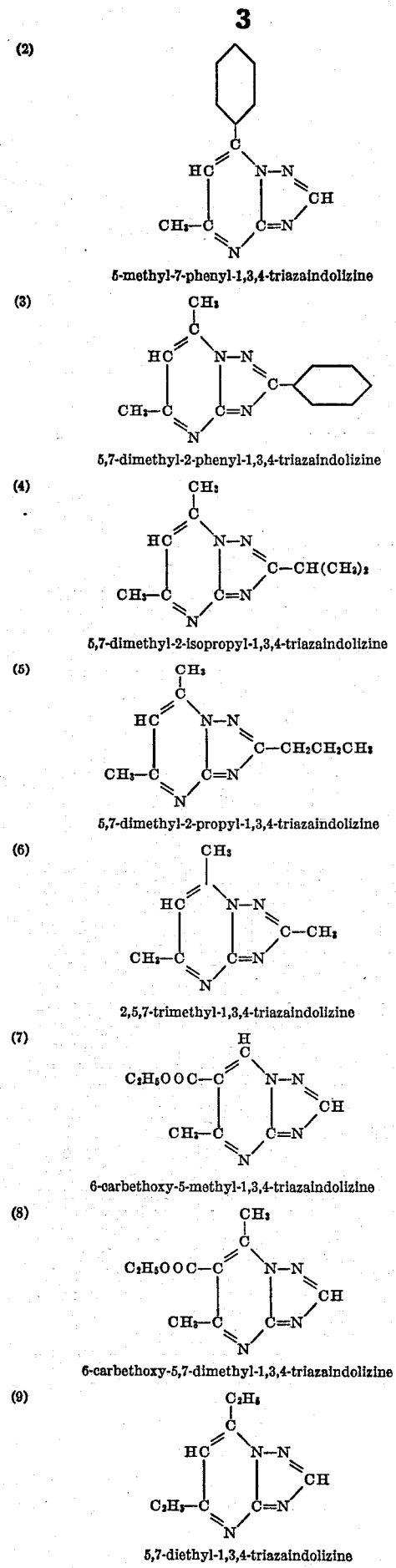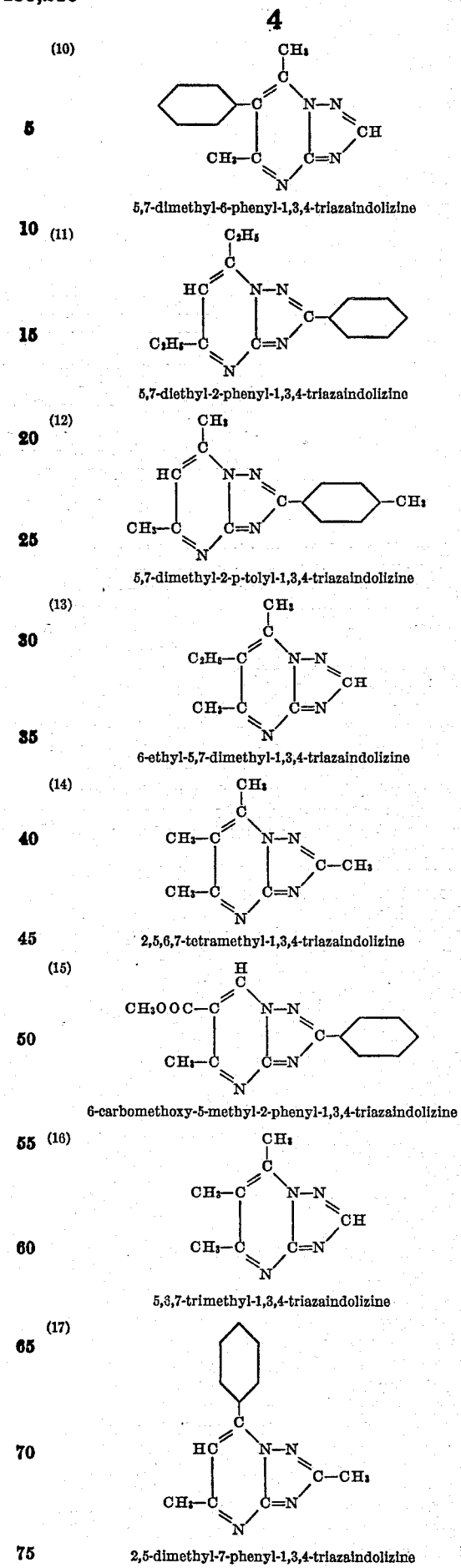

(18)

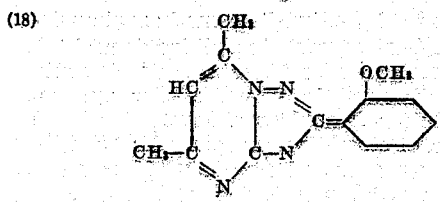

5,7-dimethyl-2-[2-methoxyphenyl]-1,3,4-triazaindolizine (19)

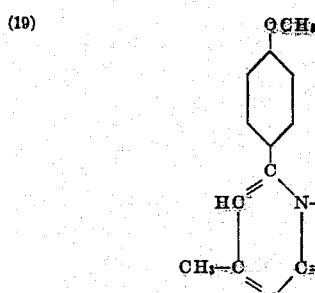

5-methyl-7-[4-methoxyphenyl]-1,3,4-triazaindolizine (20)

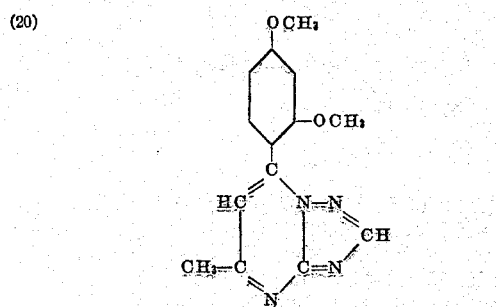

5-methyl-7-[2,4-dimethoxyphenyl]-1,3,4-triazaindolizine (21)

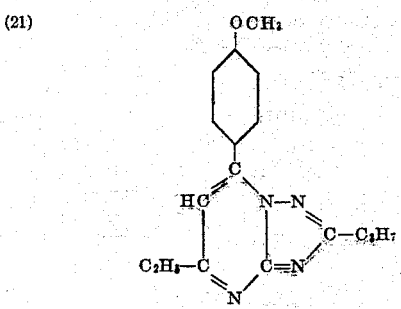

5-ethyl-7-[4-methoxyphenyl]-2-propyl-1,3,4-triazaindolizine (22)

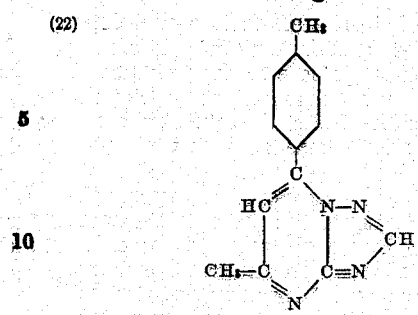

5-methyl-7-p-tolyl-1,3,4-triazaindolizine

These bases readily form hydrocarbon quaternary salts, e. g., alkyl or aralkyl quaternary salts such as the methiodide, ethiodide, phenethyl iodide, metho-p-toluenesulfonate and the like in the known manner, and undergo a condensation with any of the known cyclammonium quaternary cyanine dye salt intermediates containing a reactive group.

The dyestuffs derived from the alkyl or aralkyl quaternary salts of 1,3,4-triazaindolizines and cyclammonium quaternary cyanine dye salt intermediates have the following general formulae:

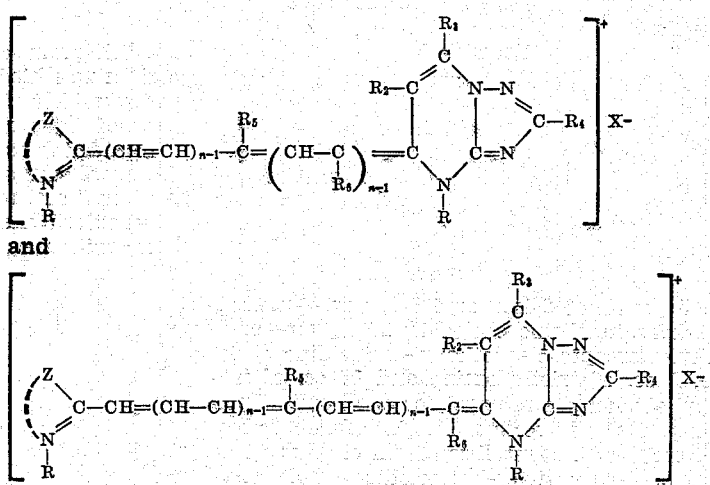

wherein R is a hydrocarbon group, for example, alkyl group, e. g., methyl, ethyl, propyl, butyl, amyl, and the like, or aralkyl group, e. g., benzyl, phenethyl, and the like, $R_2$, $R_3$ and $R_4$ have the same values as given above, $R_5$ is either hydrogen, alkyl, e. g., methyl, ethyl, propyl, butyl, and the like, $R_6$ is either hydrogen, or a methyl group, X represents an anionic acid radical, e. g., Cl, Br, I, $ClO_4$, $SO_4CH_3$, $SO_4C_2H_5$, $SO_3C_6H_4CH_3$ and the like, Z represents the atoms necessary to complete a nitrogenous heterocyclic system of the type usual in cyanine dyes such as pyridine, lepidine, quinoline, indoline, oxazole, thiazoline, thiazole, thiodiazole, selenazole, selenazoline, oxazoline, benzothiazole, benzoselenazole, benzoxazole, naphthothiazole, naphthoselenazole, and the like, and $n$ represents a positive integer ranging from 1 to 2.

In the preparation of these new dyestuffs, the 1,3,4-triazaindolizine bases are converted into their corresponding alkyl or aralkyl quaternary cyclammonium salts in the manner usual for the conversion of other nitrogenous heterocyclic bases to the quaternary salt form, i. e., by fusion with an alkyl or aralkyl halide, or by heating the base with an alkyl or aralkyl halide in a sealed tube in a water-bath under increased pressure. A molecular equivalent of the quaternary salt thus obtained is heated with a molecular equivalent of the cyclammonium quaternary cyanine dye salt intermediate in the presence of a condensing agent such as a heterocyclic nitrogenous base or an alcohol containing a small quantity of a tertiary base at reflux temperature.

As condensing agents employed in the preparation of the new dyes of the present invention, the following may be advantageously employed: heterocyclic nitrogenous bases such as pyridine, methyl pyridine, dimethyl pyridine, ethyl pyridine, ethylmethyl pyridine, trimethyl pyridine, quinoline and the like, or an alcohol such as methyl, ethyl, propyl, isopropyl, butyl, isobutyl and the like in the presence of a basic tertiary catalyst such as trimethylamine, triethylamine, and the like. In general, the amount of condensing agent used may vary within wide limits, e. g., from 1 to 25 mols. Concentrations ranging from 1 mol to about 15 mols are preferred, however.

The following examples describe in detail the methods for accomplishing the above objects, but it is to be understood that they are inserted merely for the purpose of illustration and are not to be construed as limiting the scope of the invention.

*Example I*

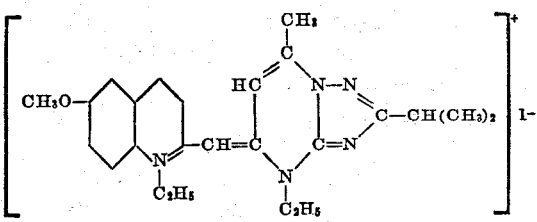

3.45 grams of 2-isopropyl-5-methyl-7-methyl-1,3,4-triazaindolizine ethiodide, 2.34 grams of 2-methyl-mercapto-6 - methoxy - quinaldine ethiodide, 2 cc. of triethylamine and 15 cc. of isopropyl alcohol are refluxed for one hour. Upon cooling, the dye precipitates. The final product is filtered and recrystallized from ethanol. The dye sensitized a silver-bromoiodide emulsion to 585 m$\mu$, with a maximum at 535 m$\mu$.

*Example II*

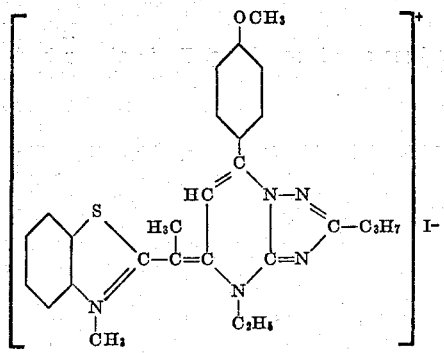

2.06 grams of 5-ethyl-7-(4-methoxyphenyl)-2-propyl-1,3,4-triazaindolizine ethiodide and 1.61 grams of 2-methyl-mercapto-benzothiazole methiodide are dissolved in 10 cc. of dry pyridine and the solution heated at reflux for about ½ hour. 10 cc. of piperidine are then added and the reaction mixture heated for about 10 minutes. The reaction mixture is cooled, the precipitate recovered and recrystallized from ethanol. The dye sensitized a silver-bromoiodide emulsion to about 590 m$\mu$, with a maximum at 540 m$\mu$.

*Example III*

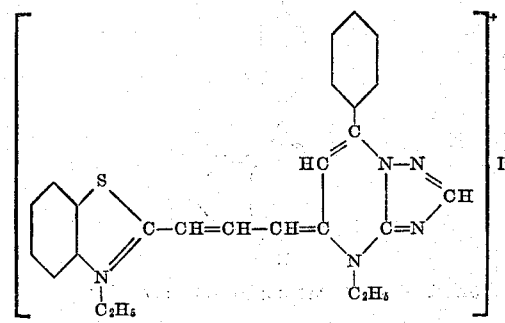

3.65 grams of 5-methyl-7-phenyl-1,3,4-triazaindolizine ethiodide and 3.04 grams of 2-$\beta$-acetanilidovinyl benzothiazole ethiodide are refluxed in 15 cc. of dry pyridine for 40 minutes. Ethyl alcohol is added to the cooled reaction mixture, and after several hours of standing, the dye crystals are filtered and recrystallized from ethanol. The dye sensitized a silver-bromoiodide emulsion to 640 m$\mu$, with a maximum at 610 m$\mu$.

*Example IV*

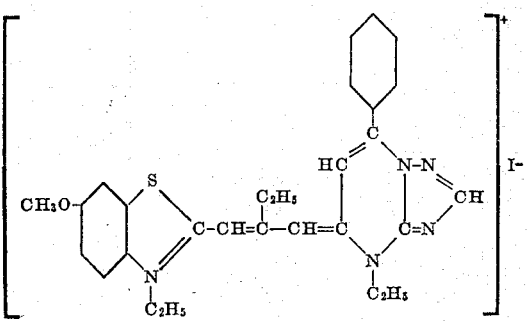

0.45 gram of 5-methyl-7-phenyl-1,3,4-triazaindolizine ethiodide, 0.39 gram of 2-($\beta$-ethyl-$\beta$-methylmercaptovinyl)-6-methoxy - benzothiazole ethiodide, 15 cc. of isopropyl alcohol and 0.2 cc. of triethylamine are refluxed for one hour. Upon cooling the dye precipitates. The product is filtered and recrystallized from ethanol. The dye sensitized a silver-bromoiodide emulsion to 700 m$\mu$, with a maximum at 640 m$\mu$.

*Example V*

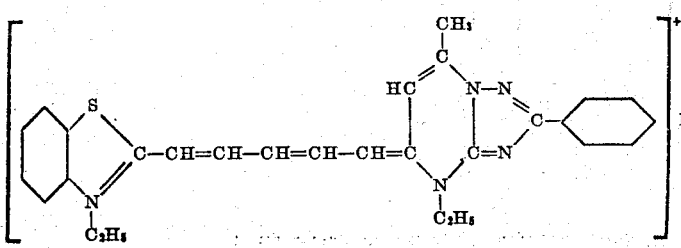

3.79 grams of 2-phenyl-5,7-dimethyl-1,3,4-triazaindolizine ethiodide, 3.92 grams of 2-(4-ethoxy-1,3-butadienyl)-benzothiazole ethiodide, and 15 cc. of dry pyridine are refluxed for 50 minutes. Ethyl alcohol is added to the cooled reaction mixture, and after several hours of standing, the dye crystals are filtered and recrystallized from ethanol. The dye sensitized a silver-bromoiodide emulsion to 760 mμ, with a maximum at 720 mμ.

Example VI

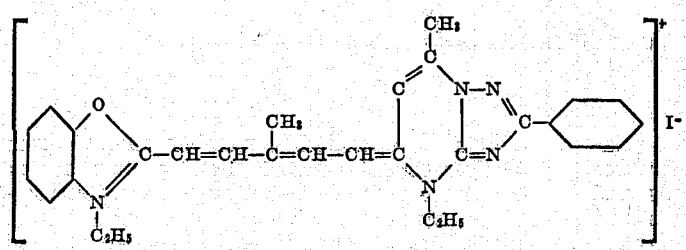

Example V was repeated with the exception that 4.17 grams of 2(4-anilino-3-ethyl-1,3-butadienyl) benzoxazole ethiodide was substituted for 3.92 grams of 2-(4-ethoxy-1,3-butadienyl-benzothiazole ethiodide. The resulting dye sensitized a silver-bromoiodide emulsion to 720 mμ, with a maximum at 680 mμ.

Example VII

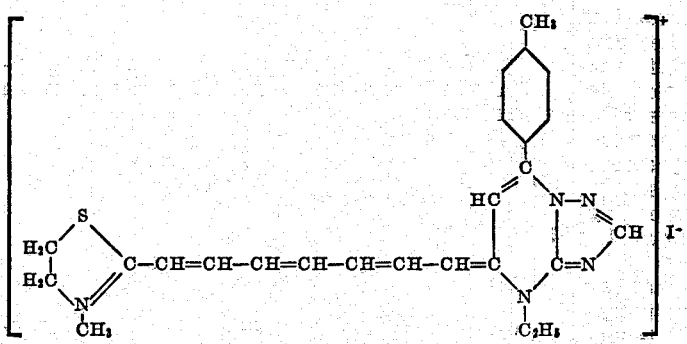

3.79 grams of 5-methyl-7-p-tolyl-1,3,4-triazaindolizine ethiodide and 3.97 grams of 2-(6-anilino-1,3,5-hexatrienyl) thiazoline methiodide are mixed together in 8 cc. of dry pyridine. The resulting mixture is gently boiled, under reflux, for about 40 minutes. The reaction mixture is then chilled and the crystalline dye which separates out is filtered and recrystallized from methanol. The dye sensitized a silver-bromoiodide emulsion to 760 mμ, with a maximum at 720 mμ.

Example VIII

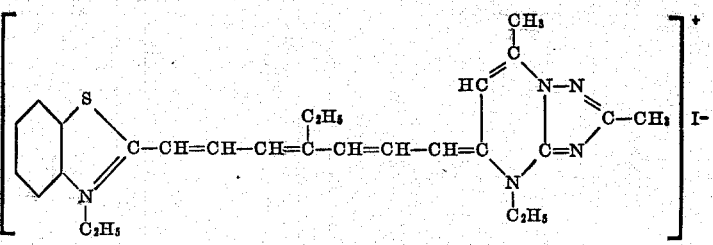

3.17 grams of 2,5,7-trimethyl-1,3,4-triazaindolizine ethiodide, 4.48 grams of 2-(6-anilino-4-ethyl-1,3,5-hexatrienyl) benzothiazole ethiodide, and 12 cc. of dry pyridine are refluxed for 1 hour. Ethyl alcohol is added to the cooled reaction mixture and after several hours of standing, the dye crystals are filtered and recrystallized from ethanol. The dye sensitized a silver-bromoiodide emulsion to 800 mμ, with a maximum at 760 mμ.

Example IX

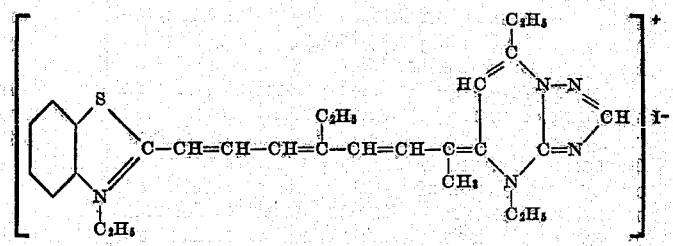

Example VIII was repeated with the exception that 3.30 grams of 5,7-diethyl-1,3,4-triazaindolizine ethiodide was substituted for 3.17 grams of 2,5,7-trimethyl-1,3,4-triazaindolizine ethiodide. The dye sensitized a silver-bromoiodide emulsion to 790 mμ, with a maximum at 750 mμ.

The diagrammatic spectrograms constituting the accompanying drawing illustrate the regions of the spectrum to which the various 1,3,4-triazaindolizine cyanine dyes will sensitize a gelatino silver-halide emulsion containing about 4-5% of silver-halide and the extent of the sensitization at various wave lengths. The nine figures of this drawing illustrate the sensitizing properties of the dyes prepared in accordance with the preceding examples.

In the preparation of photographic gelatino-silver-developing-out emulsions, such as gelatino-silver-chloride, gelatino-silver-chlorobromide, gelatino-silver-bromoiodide emulsions, and the like, containing the mono- and polymethine dyestuffs of the present invention, it is only necessary to disperse the dyestuffs in the emulsions. It is convenient to add the compounds from solutions in appropriate solvents. An alcohol, such as methanol or ethanol, is satisfactory, as a solvent for the dyestuffs.

Emulsions prepared in accordance with this invention can be coated in the usual manner upon any desired support, such as cellulose nitrate, cellulose acetate, polyvinyl acetal resin, glass, paper and the like.

The concentration of these new dyestuffs in the emulsion can vary widely, i. e., from about 5 to about 100 mg. per liter of flowable emulsions. The concentration of the dyestuff will vary according to the type of light-sensitive material in the emulsion and according to the effect desired. The suitable and most economical concentration for any given emulsion will be apparent to those skilled in the art upon making the ordinary tests and observations customarily used in the art of emulsion making.

The new dyestuffs of the present invention have an additional advantage in that they can be employed in the manufacture of light filters, anti-halation coatings and in the coloring of cellulose acetate yarn, i. e., cellulose acetate silk. This is due primarily to the increased water solubility imparted to the dyestuffs by the presence therein of the 1,3,4-triazaindolizine nucleus.

This application is a division of my copending application, Serial No. 661,353, filed April 11, 1946.

While the present invention has been described in considerable detail with respect to certain preferred procedures, materials and uses, it is understood that the new class of mono- and polymethine 1,3,4-triazaindolizine cyanines and their use as sensitizing dyes is not limited thereto, and that numerous variations and modifications may be made. As for example, by condensing a quaternary salt of a 1,3,4-triazaindolizine with a dialkylaminobenzene in the presence of a basic condensing agent, e. g., piperidine, styryl dyes are obtained. The scope of the invention is to be limited solely by the appended claims.

I claim:

1. A photographic gelatino silver-halide emulsion which contains a dyestuff characterized by a formula selected from the class consisting of the following formulae:

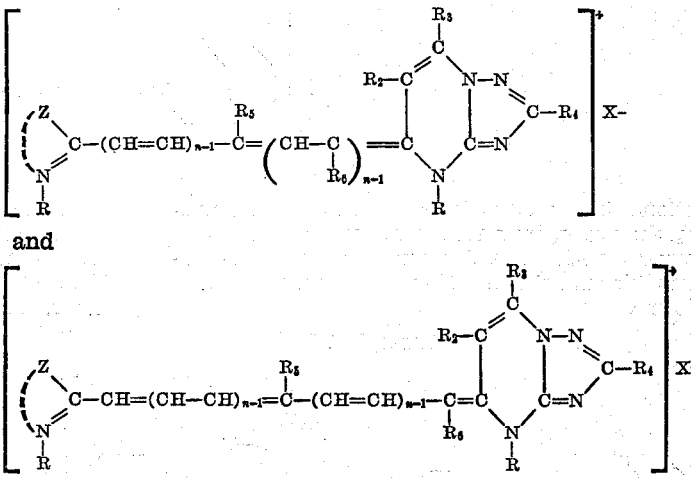

wherein R represents a member selected from the class consisting of alkyl and aralkyl groups, $R_2$ is a member selected from the class consisting of hydrogen, alkyl, carbalkoxy, and aryl groups, $R_3$ and $R_4$ represent the members selected from the class consisting of hydrogen, alkyl, aryl, aralkyl, alkoxyphenyl, and dialkoxyphenyl groups, $R_5$ is a member selected from the class consisting of hydrogen and alkyl groups, $R_6$ is a member selected from the class consisting of hydrogen and methyl groups, n represents a positive integer ranging from 1 to 2, X represents an anionic radical, and Z represents the atoms necessary to complete a heterocyclic nitrogenous system.

2. A photographic gelatino silver-halide emulsion which contains a dyestuff of the following structure:

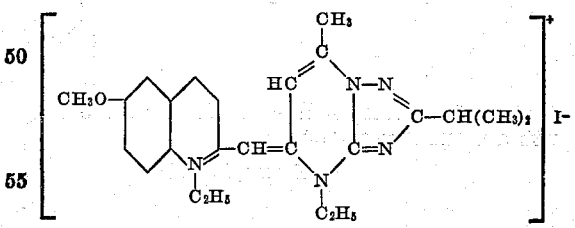

3. A photographic gelatino silver-halide emulsion which contains a dyestuff of the following structure:

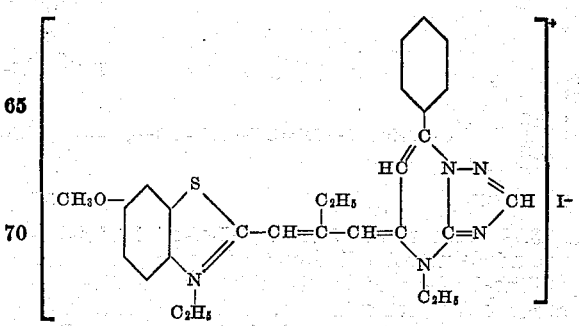

4. A photographic gelatino silver-halide emulsion which contains a dyestuff of the following structure:
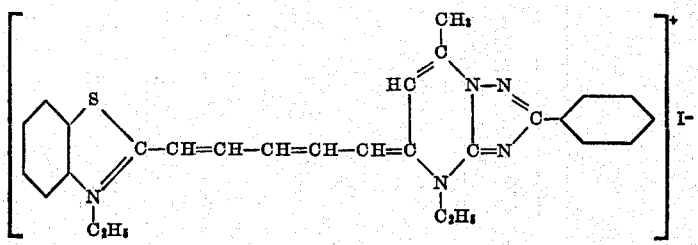
NEWTON HEIMBACH.
REFERENCES CITED
The following references are of record in the file of this patent:
UNITED STATES PATENTS
| Number | Name | Date |
|---|---|---|
| 2,153,928 | Kendall | Apr. 11, 1939 |